United States Patent [19]  
Estkowski et al.

[11] Patent Number: 5,276,942  
[45] Date of Patent: Jan. 11, 1994

[54] APPLIANCE ROLLER

[75] Inventors: Michael H. Estkowski; Christopher F. Estkowski, both of St. Joseph, Mich.

[73] Assignee: Shepherd Products U.S., Inc., St. Joseph, Mich.

[21] Appl. No.: 901,940

[22] Filed: Jun. 22, 1992

Related U.S. Application Data

[63] Continuation-in-part of Ser. No. 725,554, Jul. 3, 1991, abandoned.

[51] Int. Cl.$^5$ ................... A47B 91/00; B60B 33/00
[52] U.S. Cl. ............................ 16/47; 16/45; 16/18 A; 16/34
[58] Field of Search ........... 16/47, 48, 18 A, 34

[56]  References Cited

U.S. PATENT DOCUMENTS 411,181  9/1889  Barron .
2,663,048  12/1953  Ross, Jr. et al. .
3,220,744  11/1965  Gomory et al. .

FOREIGN PATENT DOCUMENTS 1427653  1/1966  France ........................ 16/18 A
2507  6/1876  United Kingdom ............. 16/47
565138  10/1944  United Kingdom .

Primary Examiner—John Sipos
Assistant Examiner—Carmine Cuda
Attorney, Agent, or Firm—Lee, Mann, Smith, McWilliams, Sweeney & Ohlson

[57]  ABSTRACT

A roller mechanism for supporting an article on a support surface for selective movement thereon. The roller mechanism including a support member rotatably connected to the article to be supported, a bearing for providing antifriction rotation between the support member and the article to be supported, an axle or axles connected to the support member, and a plurality of roller elements mounted about the support member in a generally circular pattern, each roller element being independently rotatable about an axle. The roller mechanism may be selectively pivotal between a first position in which the support member and axle are inclined at an acute angle to the support surface such that less than all of the roller elements are in engagement with the support surface, whereby the roller mechanism is capable of moving in any direction along the support surface, and a second position in which the support member and the axle are substantially parallel to the support surface such that substantially all of the roller elements are in engagement with the support surface, whereby movement of the roller mechanism in any direction along the support surface is inhibited.

8 Claims, 4 Drawing Sheets

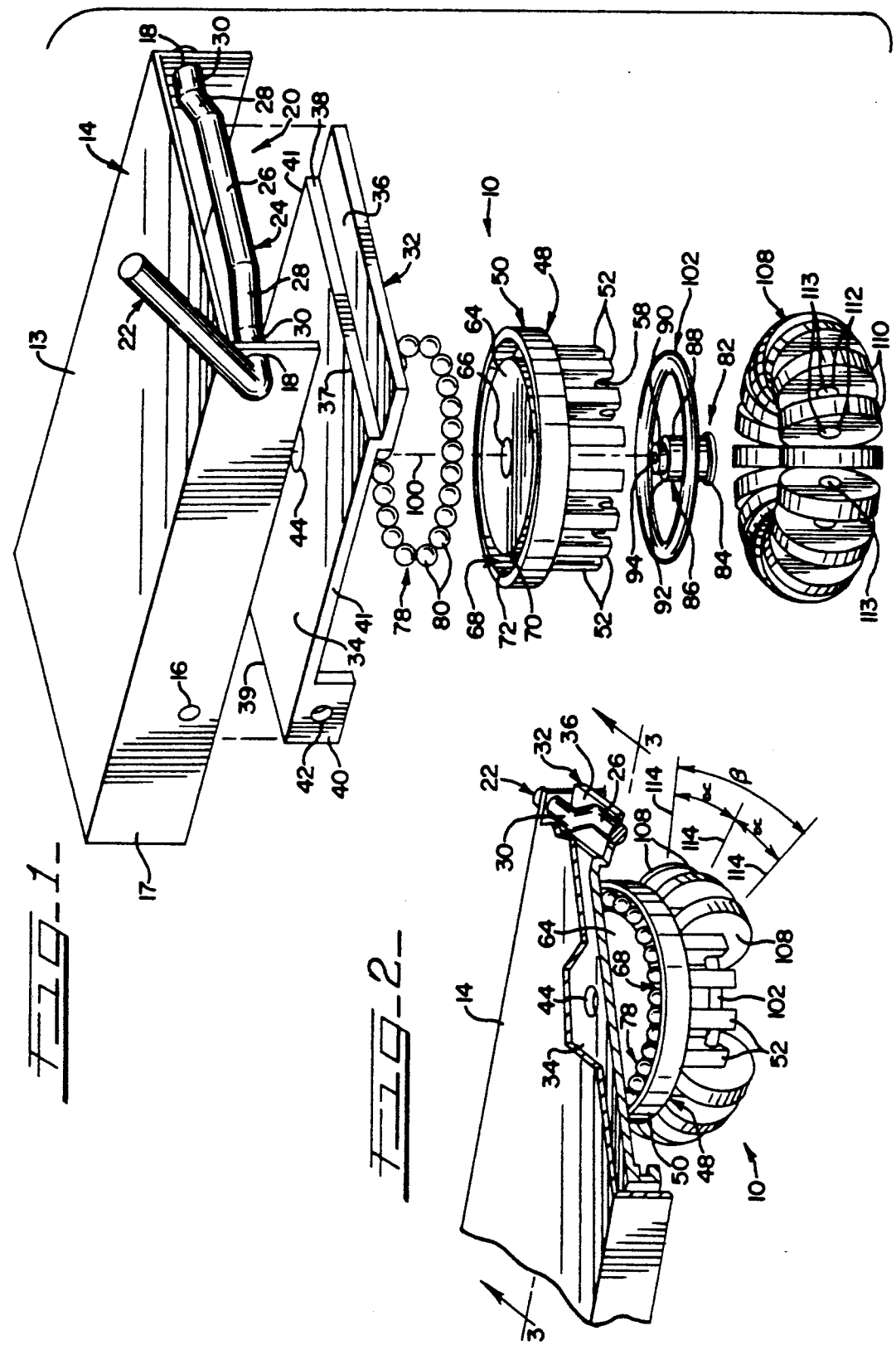

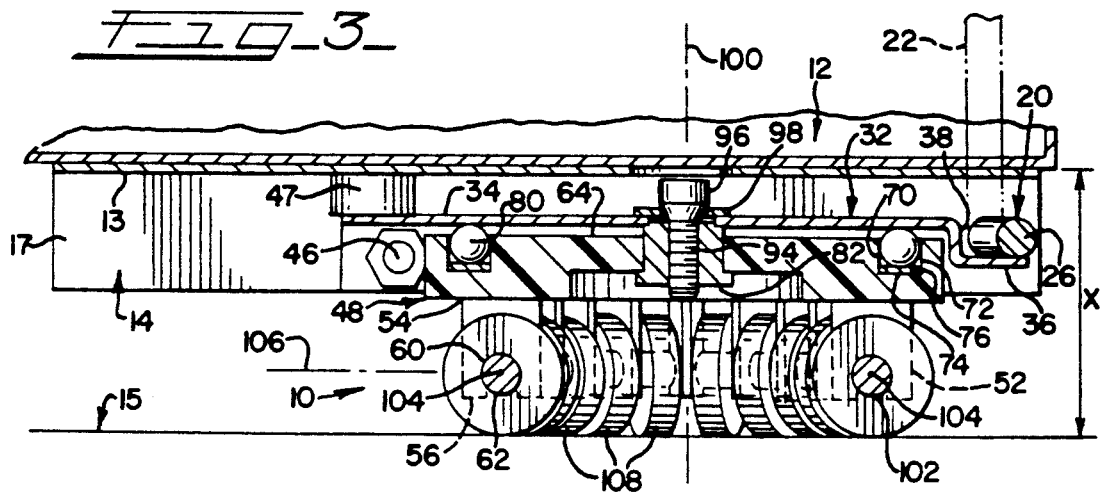
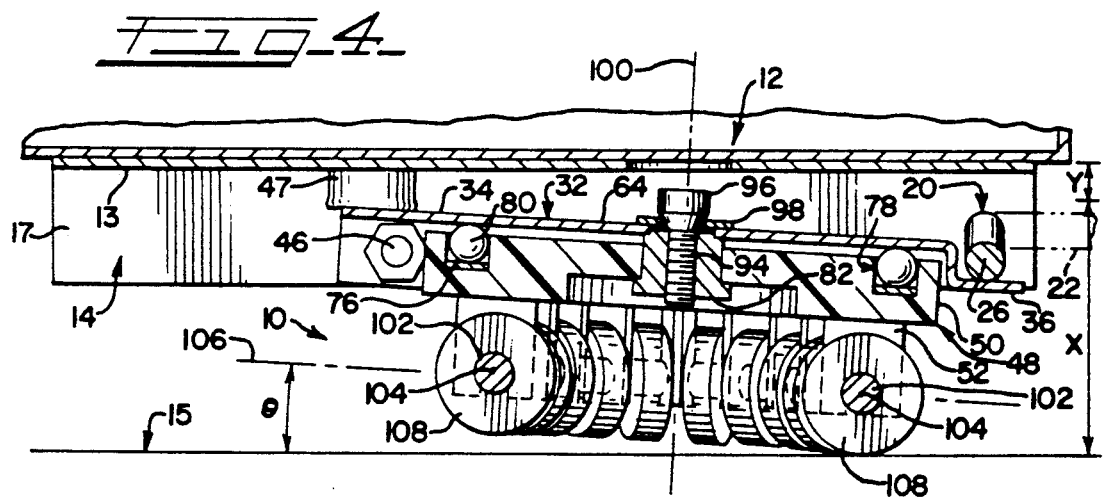

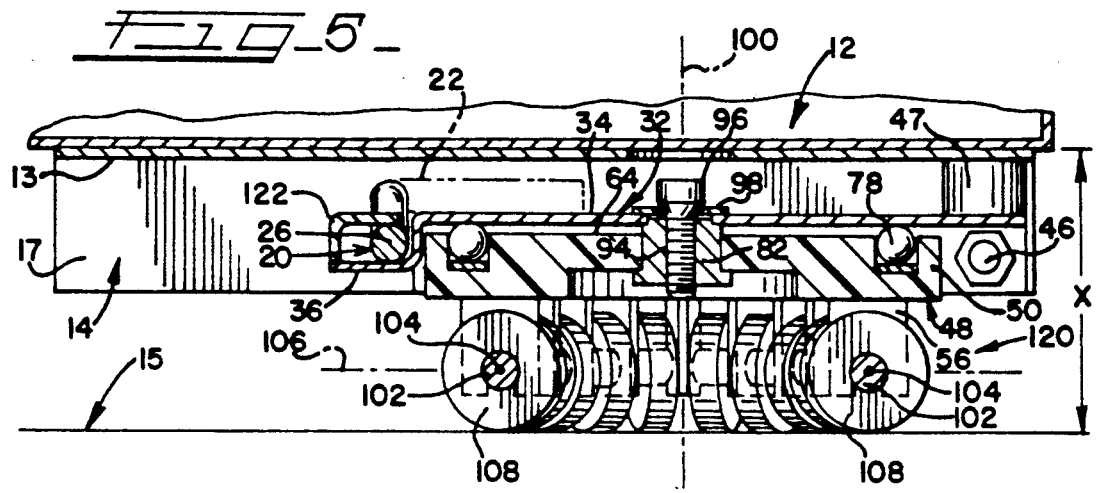
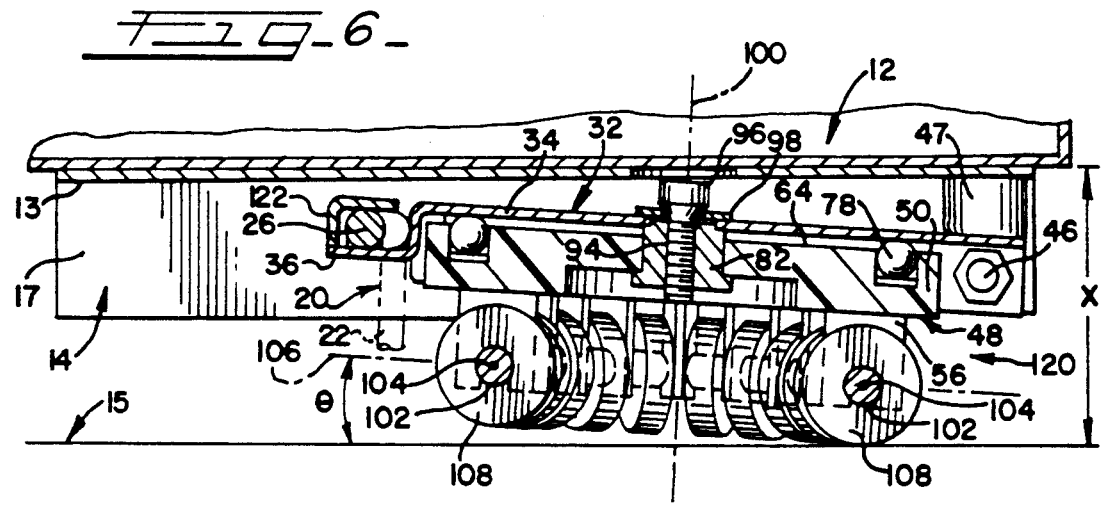
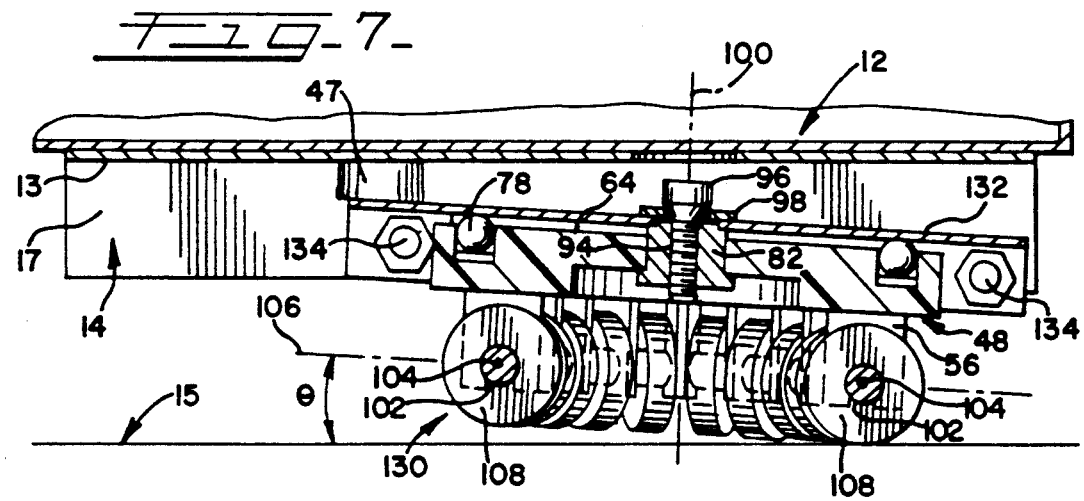

APPLIANCE ROLLER

RELATED APPLICATIONS

This application is a continuation-in-part of U.S. patent application Ser. No. 07/725,554, filed Jul. 3, 1991 abandoned.

BACKGROUND OF THE INVENTION

The present invention relates to a roller mechanism for supporting an appliance or other article on a surface which selectively permits or prevents, as desired, movement of the article along the support surface.

Various types of roller mechanisms have been used to support appliances, such as refrigerators, freezers, and other articles on a floor to permit rolling of the article along the floor. These prior roller mechanisms have generally included one or more wheels rotatably attached to an axle which is fixed to the appliance such that the appliance may only be rolled back and forth along the floor in a straight line. Such roller mechanisms do not allow for lateral movement of the appliance without sliding the roller mechanism along the floor surface. Other roller mechanisms such as casters, having one or more wheels rotatably mounted on a horizontal axle which is rotatable about an offset vertical axis, have also been used. While such casters permit movement in any direction along the support surface, a change in direction of movement will shift the location of the appliance in relation to the caster wheels. This type of motion of the appliance on swivelling casters may be detrimental when opening or closing magnetically latched refrigerator doors. While it is desirable to utilize a roller mechanism which is able to roll in any direction along a floor surface, it is also desirable to be able to selectively inhibit or prevent the roller mechanism from rolling.

SUMMARY OF THE INVENTION

The present invention provides a roller mechanism for supporting an article on a surface for selective rolling movement thereon. The roller mechanism, in one embodiment, includes a plate pivotally attached to the article and a support member rotatably attached to the plate. One or more axles arranged in a generally circular configuration are connected to the support member and a plurality of roller elements are mounted on the axles. The roller elements are positioned about the support member in a generally circular pattern, with each roller element being independently rotatable about an axle. The roller elements may be positioned such that each roller element will roll along a line which extends radially from the center of rotation of the support member or such that each roller element is positioned at an acute angle to such a line. The roller mechanism is pivotable between a first position in which the support member and axles are inclined at an acute angle to the support surface, such that less than all of the roller elements are engaged with the support surface, and a second position in which the support member and axle are substantially parallel to the support surface wherein substantially all of the roller elements are in engagement with the support surface. When in the inclined position, the roller mechanism is capable of moving in any direction along the support surface, and when in the parallel position, movement of the roller mechanism in any direction along the support surface is inhibited. The present invention is not hampered by castering effects, it immediately moves in the direction of urging force.

DESCRIPTION OF THE DRAWINGS

FIG. 1 is an exploded view of one embodiment of the roller mechanism.

FIG. 2 is a perspective view of the roller mechanism having a portion of the mechanism removed for clarity.

FIG. 3 is a cross sectional view taken along line 3—3 of FIG. 2 of the roller mechanism of FIG. 1 shown in the parallel position.

FIG. 4 is a cross sectional view of the roller mechanism of FIG. 1 shown in the inclined position.

FIG. 5 is a cross sectional view of a second embodiment of a roller mechanism shown in the parallel position.

FIG. 6 is a cross sectional view of the roller mechanism of FIG. 5 shown in the inclined position.

FIG. 7 is a cross sectional view of a third embodiment of a roller mechanism shown in a permanently fixed inclined position.

DESCRIPTION OF THE PREFERRED EMBODIMENTS

Figure 8:
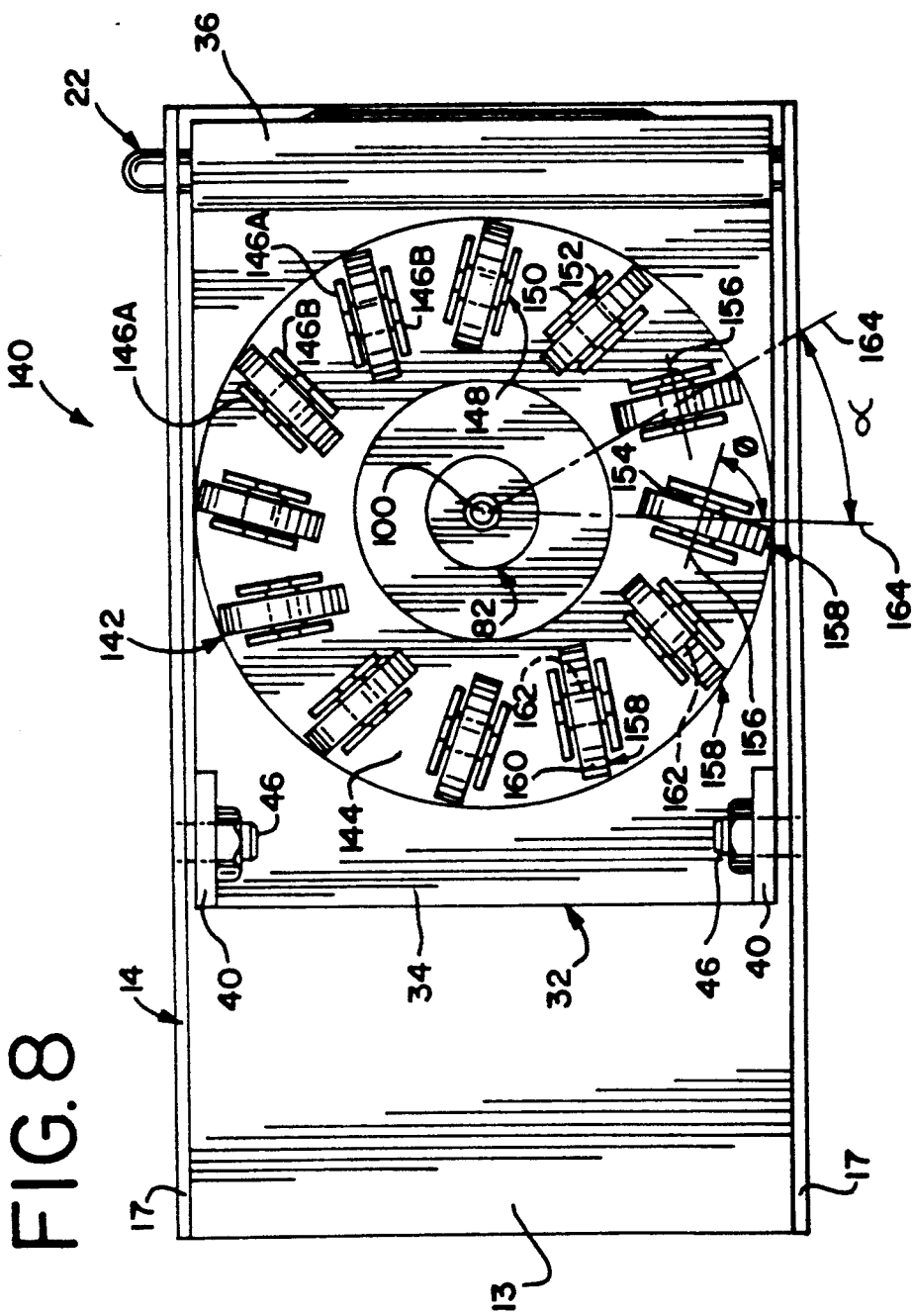
FIG. 8 is a bottom view of a fourth embodiment of the roller mechanism with the axles of the roller elements attached to the support member at an acute angle to a radial line extending from the center of the support member.

A first embodiment of roller mechanism 10 is shown in FIGS. 1-4 supporting an article 12. A mounting frame 14 is provided at the upper end of the roller mechanism 10. The roller mechanism 10 supports the article 12 on a floor 15. The article 12 may be a refrigerator, freezer, table, creeper, skate board or any other article or appliance. The floor 15 may be any type of support surface including wood, concrete, tile or carpet.

As best shown in FIG. 1, the mounting frame 14 includes a flat support surface 13 and two apertures 16, only one of which is shown, formed in the downwardly extending flanges 17. The mounting frame 14 also includes two apertures 18. A cam arrangement 20 having a handle 22 and shaft 24 is rotatably mounted in the mounting frame 14. The shaft 24 includes a cylindrical center portion 26, a cylindrical angled portion 28 extending from each end of the center portion 26 and a cylindrical end portion 30 extending from each angled portion 28. Each end portion 30 of the shaft 24 extends through a respective aperture 18 in the mounting frame 14 and is rotatable therein. The central axis of the center portion 26 is parallel to, but offset from, the central axis of the end portions 30. The handle 22 is attached to one end portion 30 at substantially a right angle thereto.

The roller mechanism 10 further includes a mounting plate 32 having an upper shelf 34 and a lower shelf 36 extending from a first end 37 of the upper shelf 34. The upper shelf 34 and the lower shelf 36 are parallel to one another. The plate 32 includes a wall 38 which is formed by the end 37 of the upper shelf 34. The wall 38 is perpendicular to the lower shelf 36. The upper shelf 34 includes two ears 40 (only one shown) which downwardly depend from respective sides 41 of the upper shelf 34 near a second end 39 of the upper shelf 34. Each ear 40 includes an aperture 42. The plate 32 also includes a central aperture 44 extending through the upper shelf 34. The plate 32 is pivotally connected to the mounting frame 14 by a pair of fasteners 46 best shown in FIG. 3 which respectively extend through the apertures 16 in the mounting frame 14 and the apertures 42 in the ears 40. An elastomeric bumper 47 shown in FIG. 3 is located between the plate 32 and the frame 14 near each ear 40. The bumpers 47 absorb shocks between the plate 32 and the frame 14 to reduce noise.

The roller mechanism 10 also includes a support member 48. The support member 48 includes a circular disk 50 and a plurality of legs 52 downwardly depending from the disk 50. Each leg 52 includes a first end 54 shown in FIG. 3 which is attached to the disk 50 and a second end 56 which includes a slot 58 shown in FIG. 1. Each slot 58 is formed by a circular wall 60 and an opening 62 which is smaller in diameter than the circular wall 60. The legs 52 are located around the disk 50 in a circular pattern and are preferably equally spaced from one another. The legs 52 are oriented such that the slots 58 form an imaginary torus. The disk 50 includes an upper surface 64 and a cylindrical bore 66 which extends through the upper surface 64 and the disk 50. The bore 66 is larger in diameter than the central aperture 44 in the plate 32. The disk 50 also includes an annular recess 68 which is formed by a cylindrical inner wall 70, a cylindrical outer wall 72 and a circular bottom surface 74. A circular race 76 is located within the recess 68 adjacent the bottom surface 74. A bearing assembly 78, comprising a plurality of spherical balls 80, is located within the annular recess 68 adjacent the race 76. The support member 48 is preferably made of plastic, but may be made of various other materials as desired. The race 76 may be made of metal or plastic and may be an integral part of the disk 50 and may form the bottom surface 74.

The roller mechanism 10 also includes a pin 82. The pin 82 includes a head 84 and a stem 86 having a first cylindrical portion 88 and a second cylindrical portion 90. The head 84 is larger in diameter than the first cylindrical portion 88. The first cylindrical portion 88 is larger in diameter than the second cylindrical portion 90 and forms a shoulder 92 therewith. A threaded bore 94, best shown in FIG. 3, extends longitudinally through the stem 86 and the head 84 of the pin 82. The first cylindrical portion 88 of the stem 86 extends through the bore 66 in the support member 48, and the second cylindrical portion 90 of the stem 86 extends into the central aperture 44 of the plate 32. The support member 48 is rotatably attached to the plate 32 by a bolt 96 which extends through a washer 98 and which is threadably engaged within the threaded bore 94 of the pin 82. The bolt 96 secures the shoulder 92 of the pin 82 against the plate 32 while allowing the support member 48 to freely rotate around the first cylindrical portion 88 of the pin 82 and about an axis 100 which extends through the center of the aperture 44, the bore 66 and the threaded bore 94.

The roller mechanism 10 also includes a circular axle 102 which is snap-fit within the slots 58 of the legs 52. The axle 102 is circular in cross section and includes a circular axis 104 which lies in a plane 106. The axle 102 is larger in diameter than the opening 62 in the legs 52 such that it must be snapped into the slot 58 of the legs 52 whereupon the axle 102 will be removably retained. The axle 102 illustrated is shown as being of one piece construction with a split, not shown, however, it could also be two half round pieces all the way up to a plurality of short pieces of axle between each adjacent pair of legs 52.

The roller mechanism 10 also includes a plurality of roller elements 108. Each roller element 108 comprises an individual wheel and includes a circular peripheral surface 110 for engaging the floor 15 and a bore 112 extending through the center of the roller element. Each bore 112 includes a central axis 113 about which each roller element 108 rotates. The roller elements 108 are rotatably mounted on the axle 102. Each roller element 108 is independently rotatable about the circular axis 104 of the axle 102. The number of roller elements 108 utilized, as well as the diameter and width of the peripheral surface 110 of each roller element 108, may be varied as desired. More than one roller element 108 may be located between adjacent legs 52 if desired. As best shown in FIGS. 1 and 2, the roller elements 108 are located in a circular pattern around the axis 100. As shown in FIG. 2, the orientation of each roller element 108 is illustrated by the lines 114 which are perpendicular to the central axis 113 of each respective roller element 108 and which extend substantially radially from the axis 100. The roller elements 108 are located on the axle 102 such that the orientation line 114 of each roller element 108 is at an angle $\alpha$ from the orientation line 114 of adjacent roller elements 108. The angle $\alpha$ may be varied as desired, however, the roller elements 108 are preferably uniformly located around the axle 102 at the same angle from one another. The roller elements 108 are preferably made of plastic however other materials may be used as desired.

The roller mechanism 10 of this embodiment, including the plate 32, is selectively pivotal between a first position, as shown in FIG. 3, and a second position as shown in FIG. 4. As shown in FIG. 3, the plane 106 of the axle 102 and the upper surface 64 of the support member 48 are substantially parallel to the floor 15. In this position substantially all of the roller elements 108 engage the floor 15. While preferably all of the roller elements 108 would engage the floor 15, due to surface irregularities in the floor 15 or to small variances in the size of the respective roller elements 108, less than all of the roller elements 108 may engage the floor 15.

As shown in FIG. 3, when the roller mechanism 10 is in this position, the cam 20 is positioned such that the end portions 30 of the shaft 24 are in contact with the lower shelf 36 of the plate 32. When the roller mechanism 10 is in this position, the weight of the appliance 12 will be transferred from the frame 14 to the plate 32 through the fasteners 46 and the end portions 30 of the cam 20. The plate 32 is uniformly supported by the bearing assembly 78 and the support member 48 such that the weight of the appliance 12 is uniformly distributed to each of the roller elements 108. When the roller mechanism 10 is in this position, the appliance 12 is located a distance X above the floor 15 as shown in FIG. 3.

When the roller mechanism 10 is in the position, as shown in FIG. 3, rolling movement of the roller mechanism 10 in any direction along the floor is prevented. Of course, it may be possible to slide or skid the roller mechanism 10 across the floor 15 upon the application of sufficient force, however, sliding of the roller mechanism 10 is undesirable as it requires a large force and is detrimental to the floor 15. Movement of the roller mechanism 10 along the floor 15 in this position is inhibited due to the circular arrangement of the roller elements 108 whereby there are always many roller elements 108 oriented in whole or in part transversely to the direction of desired movement. These roller elements are not capable of rotating in the desired direction of movement and actually inhibit movement in that direction. When all roller elements 108 are contacting the surface 15 there is maximum contact and consequent minimum unit pressure. This is desirable on softer flooring.

The roller mechanism 10 is shown in an inclined position in FIG. 4 wherein the plane 106 of the axle 102 and the upper surface 64 of the support member 48 are inclined at an angle $\theta$ to the floor 15. The roller mechanism 10 is pivoted from the position of FIG. 3 to the position of FIG. 4 by rotation of the cam 20. The cam 20 is rotated such that the center portion 26 of the shaft 24 comes into contact with the lower shelf 36 of the plate 32. Further rotation of the cam 20 will pivot the plate 32 about the fasteners 46, moving the lower shelf 36 away from the appliance 12 such that the plane 106 is at an angle $\theta$ to the floor 15. As the roller mechanism 10 is pivoted, a portion of the roller elements 108 are raised above the floor 15. In pivoting the roller mechanism 10 from the parallel position to the inclined position, the cam 20 raises the appliance 12 an additional distance Y above the floor 15, and in doing so, the cam 20 must lift the entire weight of the appliance 12 which is supported by the roller mechanism 10. The magnitude of the distance Y is a function of the angle $\theta$ at which the roller mechanism 10 is inclined. The roller mechanism 10 may be pivoted to any angle $\theta$ between 0° and 90°. The number of roller elements 108 which are raised above and out of engagement with the floor 15 is dependent upon the angle $\theta$ at which the roller mechanism 10 is inclined.

The roller mechanism 10 is preferably inclined at an angle $\theta$ wherein the roller elements 108 which remain in engagement with the floor 15 are all oriented substantially parallel to one another. The orientation lines 114 of adjacent roller elements 108 are located at an angle $\alpha$ to each other as shown in FIG. 2. The sum of the angles $\alpha$ between the roller elements 108 which are in engagement with the floor 15 when the roller mechanism 10 is inclined at an angle $\theta$ equals the angle $\beta$. For example, if the roller mechanism 10 includes eighteen roller elements 108, the roller elements will be equally spaced apart such that the angle $\alpha$ will equal 20°. In this case it would be preferred that no more than three roller elements 108 be in engagement with the floor 15 as the angle $\beta$ for three adjacent roller elements 108 would equal 40°. The desired angle $\theta$ may be varied depending upon the type of floor surface 15. Vinyl tile floor surfaces 15 may require a larger angle $\theta$ than a hardwood or concrete floor 15; and a carpeted floor 15 may require a larger angle $\theta$ than a vinyl tile floor 15.

When the roller mechanism 10 is in the inclined position as shown in FIG. 4, the article 12 may be rolled along the floor 15 in any direction. The roller mechanism 10 provides rolling movement in two different manners. When the roller mechanism 10 is moved in a direction which is substantially parallel to the orientation lines 114 of the roller elements 108 which are in engagement with the floor 15, rolling movement of the roller mechanism 10 will be accomplished through rotation of the roller elements 108 which are in engagement with the floor 15 about the axle 102 and without any rotation of the support member 48 about the axis 100. When any other direction of movement is desired, rolling movement of the roller mechanism 10 will be provided through a combination of rotation of the roller elements 108 which are in engagement with the floor 15 about the axle 102 and rotation of the support member 48 about the axis 100. In this mode of rolling movement, the individual roller elements 108 which are in engagement with the floor will continually be changing as the support member 48 rotates about the axis 100, however, the number of roller elements 108 that are in engagement with the floor 15 will remain constant. This assembly of roller elements 108 about circular axle 102 comprises a segmented toroid that rotates both about its central axis 100 and its peripheral axis 104.

A second embodiment of roller mechanism is shown in FIGS. 5 and 6 as roller mechanism 120. The roller mechanism 120 is structurally the same as the roller mechanism 10 except that the plate 32 includes a bracket 122 attached to the lower shelf 36. The bracket 122 extends around the center portion 26 of the cam 20. The roller mechanism 120 is shown in the parallel position in FIG. 5 wherein movement of the roller mechanism 120 along the floor 15 is inhibited. The roller mechanism 120 is shown in the inclined position at an angle $\theta$ in FIG. 6 wherein the roller mechanism 120 is movable along the floor 15 in any direction as desired.

The difference between the roller mechanism 120 shown in FIGS. 5 and 6 and the roller mechanism 10 shown in FIGS. 3 and 4 is in the way the roller mechanism 120 is moved between the parallel position and the inclined position. When the roller mechanism 10 shown in FIGS. 3 and 4 is moved from the parallel position to the inclined position, the cam 20 must lift the entire weight of the appliance 12 which is supported by the roller mechanism 10 and in doing so raises the appliance 12 an additional distance Y shown in FIG. 4 above the floor 15. When the roller mechanism 120 is moved from the parallel position shown in FIG. 5 to the inclined position shown in FIG. 6, the cam 20 is rotated such that the center portion 26 of the shaft 24 engages the bracket 122 and pivots the plate 32 about the fasteners 46 towards the appliance 12. In this manner, a portion of the roller elements 108 are lifted off of the floor 15 such that the plane 106 of the axle 102 and the upper surface 64 of the support member 48 are inclined at an angle $\theta$ to the floor 15 while the appliance 12 remains a distance X above the floor 15. When it is desired to move the roller mechanism 120 from the inclined position back to the parallel position, the cam 20 is again rotated to push the roller elements 108 into full engagement with the floor 15. A significantly lower amount of force is needed to pivot the roller mechanism 120 between the inclined and parallel positions as shown in FIGS. 5 and 6 than is required to similarly pivot the roller mechanism 10 shown in FIGS. 3 and 4.

A third embodiment of roller mechanism is shown in FIG. 7 as roller mechanism 130. The roller mechanism 130 is substantially the same as the roller mechanism 10 except that the support member 48 is rotatably attached to a plate 132. The plate 132 is fastened at each end to the frame 14 by fasteners 134 such that the roller mechanism 130 is fastened to the appliance 12 at a fixed inclined angle $\theta$ to the floor 15. In this embodiment however, the majority of the roller elements 108 remain out of contact with the floor 15. No provision is made for a position which inhibits movement of the roller mechanism 130 along the floor 15.

A fourth embodiment of roller mechanism is shown in FIG. 8 as roller mechanism 140. The roller mechanism 140 includes a support member 142 which includes a circular disk 144 and a plurality of legs 146A and 146B which downwardly depend from the disk 144. Each leg 146A is located adjacent to and spaced apart from a corresponding leg 146B. Each leg 146A and 146B includes a slot 148 formed by a circular wall 150 and an opening 152 which is smaller in diameter than the circular wall 150.

The disk 144 includes an upper surface 64, bore 66, annular recess 68, inner wall 70, outer wall 72, bottom surface 74 and race 76 as described in the disk 50 shown in FIGS. 1-4. A bearing assembly 78 is located within the annular recess 68 of the support member 142. The support member 142 is rotatably attached to the plate 32 by a bolt 96 which extends through washer 98 and which is threadably engaged within the threaded bore 94 of the pin 82. The bolt 96 secures the shoulder 92 of the pin 82 against the plate 32 while allowing the support member 142 to freely rotate about the axis 100.

An axle 154 extends between each adjacent pair of legs 146A and 146B and is snap-fit within the slots 148 of the legs 146A and 146B. Each axle 154 includes a central axis 156 which extends therethrough. The axles 154 are arranged in a generally circular pattern about the axis 100. The axles 154 may comprise a cylindrical piece of metal or plastic or any other means for rotatably connecting a wheel to the legs 146A and 146B.

The roller mechanism 140 also includes a plurality of roller elements 158. Each roller element 158 comprises an individual wheel which includes a circular peripheral surface 160 for engaging the floor 15. A bore 162 extends through the center of each roller element 158. A roller element 158 is rotatably mounted on each axle 154 such that the roller element 158 is rotatable about the central axis 156. Each roller element 158 is independently rotatable about the central axis 156 of its corresponding axle 154. One or more roller elements 158 may be mounted on an axle 154 between an adjacent pair of legs 146A and 146B. The number of roller elements 158 utilized, as well as the diameter and width of the peripheral surface 160 of each roller element 158, may be varied as desired. Alternatively, each roller element 158 may be connected to an axle 154 such that both the roller element 158 and the axle 154 will rotate in the slots 148 in the legs 146A and 146B about the central axis 156.

As shown in FIG. 8, the roller elements 158 are located in a circular pattern around the axis 100. The orientation of each roller element 108 and axle 154 is illustrated by the lines 164 which extend through the axis 100 and through the central axis 156 of the axles 154 midway between the legs 146A and 146B. The major distinction between the roller mechanism 140 of FIG. 8 and the roller mechanism 10 of FIGS. 1-4 is that the central axis 156 of the axles 154 is disposed at an angle $\phi$ to the lines 164 which is less than a right angle of 90°. The angle $\phi$ is an acute angle preferably in the range of 75° to 89°. Each roller element 158 is located at an angle $\alpha$ from each adjacent roller element 158 as shown in FIG. 8. The angle $\alpha$ may be varied as desired, however, the roller elements 158 are preferably uniformly located around the axis 100 at the same angle $\alpha$ from one another. The roller elements 158 are preferably made of plastic, however, other materials may be used as desired.

The roller mechanism 140, just like the roller mechanism 10, is selectively pivotal between a first position wherein substantially all of the roller elements 158 are in contact with the surface of the floor 15 and a second inclined position wherein a substantial number of the roller elements 158 are out of contact with the surface of the floor 15. When the roller mechanism 140 is in the first position, wherein substantially all of the roller elements 158 are in contact with the floor 15, movement of the roller mechanism 140 along the floor 15 is inhibited. Movement of the roller mechanism 140 along the floor 15 in this position is inhibited due to the circular arrangement of the roller elements 158 whereby there are always many roller elements 158 oriented in whole or in part transversely to the direction of desired movement. These roller elements are not capable of rotating in the desired direction of movement and actually inhibit movement in that direction.

When the roller mechanism 140 is pivoted to the second position, where the roller mechanism 140 is inclined such that a substantial number of roller elements 158 are out of contact with the floor 15, the mounting plate 32 and the roller elements 158 will be positioned at an acute angle to the article 12 to be supported and to the surface of the floor 15. When the roller mechanism 140 is in the inclined position, the roller mechanism 140 is operative to provide rolling movement of the roller mechanism 140 along the floor 15 in any desired direction due to a combination of the rotational movement of the support member 142 about the axis 100 and the rotational movement of the roller elements 158 which are in contact with the floor 15 about the central axis 156 of their respective axles 154. In this mode of rolling movement, the roller elements 158 which are in engagement with the floor 15 will continually be changing as the support member 142 rotates about the axis 100, however, the number of roller elements 158 in engagement with the floor 15 will remain constant. In the embodiment of FIG. 8, when the roller mechanism 140 is in the inclined position there will always be a combined rotation of both the support member 142 and the roller elements 158 which are in contact with the floor 15 when the roller mechanism 140 is moved along the floor 15. In contrast, when the roller mechanisms 10, 120 and 130 are in the inclined position, it is possible to move these roller mechanisms 10, 120 and 130 in a specific direction in which the roller elements 108 will rotate about the axle 102 and without any rotation of the support member 48. The advantage of this embodiment is that the constant combined rotation of the support member 142 and roller elements 158 provides easier rolling of the article 12 along the support surface 15 than do the roller mechanisms 10, 120 or 130 when they are rolled in a direction in which only the roller elements 108 rotate and not the support member 48.

The roller mechanism 140 may be moved between the first position, wherein rolling movement is inhibited, and the second inclined position, wherein the roller mechanism 140 is operative to provide rolling movement, as described in connection with the roller mechanism 10 or the roller mechanism 120. In addition, the roller mechanism 140 may be located at a fixed inclined acute angle to the floor 15 and to the article 12 as described in connection with the roller mechanism 130.

One or more roller mechanisms 10, 120, 130 or 140 may be used with an article 12 as desired. The roller mechanisms 10, 120, 130 and 140 may also be used in combination with other types of rollers.

Various features of the invention have been particularly shown and described in connection with the illustrated embodiments of the invention, however, it must be understood that these particular arrangements merely illustrate and that the invention is to be given its fullest interpretation within the terms of the appended claims.

What is claimed is:

1. A roller mechanism for supporting an article for movement, said roller mechanism including a mounting frame having a flat support surface; a mounting plate attached to said mounting frame; means for positioning said mounting plate at an acute angle to said support surface; a support member; means for mounting said support member to said mounting plate such that said support member is rotatable with respect to said mounting plate about a first axis; axle means connectable to said support member; a plurality of roller elements mountable on said axle means, said roller elements being positioned about said support member in a generally circular pattern, each said roller element being independently rotatable relative to other roller elements; and pivot means associated with said mounting plate for providing pivotal movement of said mounting plate between a first position wherein substantially all of said roller elements are in contact with the surface on which said mechanism is supported such that rolling movement of the roller mechanism along the surface is inhibited, and a second position wherein a substantial number of said roller elements are out of contact with the surface such that said roller elements which remain in contact with the surface are operative to provide rolling movement therealong.

2. The roller mechanism of claim 1 additionally including bearing means located between said support member and said mounting plate.

3. The roller mechanism of claim 1 wherein said axle means is positioned such that each said roller element rotates about a second axis, each said second axis being disposed at an acute angle relative to a radial line extending from said first axis and through the center of said roller element.

4. The roller mechanism of claim 1 wherein said axle means is positioned such that each said roller element rotates about a second axis, each said second axis being disposed perpendicular to a radial line extending from said first axis and through the center of said roller element.

5. A roller mechanism for supporting an article for movement, said roller mechanism including a mounting plate; a support member; means for mounting said support member to said mounting plate such that said support member is rotatable with respect to said mounting plate about a first axis; a plurality of roller elements; axle means for rotatably mounting said roller elements to said support member, said roller elements being positioned about said support member in a generally circular pattern, each said roller element being independently rotatable; and pivot means associated with said mounting plate for providing pivotal movement of said mounting plate between a first position wherein substantially all of said roller elements are in contact with the surface on which said mechanism is supported such that rolling movement of the roller mechanism along the surface is inhibited, and a second position wherein a substantial number of said roller elements are out of contact with the surface such that said roller elements which remain in contact with the surface are operative to provide rolling movement therealong.

6. The roller mechanism of claim 5 wherein each said roller element is rotatable about a second axis and each said roller element is positioned such that said second axis about which said roller element rotates is disposed perpendicular to a radial line extending from said first axis and through the center of said roller element.

7. The roller mechanism of claim 5 additionally including bearing means located between said support member and said mounting plate.

8. The roller mechanism of claim 5 wherein each said roller element is rotatable about a second axis and each said roller element is positioned such that said second axis about which said roller element rotates is disposed at an acute angle to a radial line extending from said first axis and through the center of said roller element.

* * * * *